United States Patent [19]
Takimoto

[11] Patent Number: 6,153,535
[45] Date of Patent: *Nov. 28, 2000

[54] METHOD FOR REMOVING A THIN FILM FOR A WINDOW GLASS

[75] Inventor: Yasuyuki Takimoto, Yokohama, Japan

[73] Assignee: Asahi Glass Company Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/955,742

[22] Filed: Oct. 22, 1997

[30] Foreign Application Priority Data

Oct. 23, 1996 [JP] Japan .................................. 8-281068

[51] Int. Cl.$^7$ .............................. B01D 11/00; H01L 21/31
[52] U.S. Cl. ........................................ 438/754; 423/658.5
[58] Field of Search .................... 423/658.5; 438/754; 427/453

[56] References Cited

U.S. PATENT DOCUMENTS

| | | |
|---|---|---|
| 3,754,881 | 8/1973 | Petticrew . |
| 3,993,835 | 11/1976 | Miedaner . |
| 4,659,512 | 4/1987 | Macedo et al. . |
| 5,332,531 | 7/1994 | Horwitz et al. . |
| 5,587,142 | 12/1996 | Horwitz et al. . |

FOREIGN PATENT DOCUMENTS

| | | |
|---|---|---|
| 43 18 178 | 12/1994 | Germany . |
| 6-40252 | 2/1994 | Japan . |
| WO 95/34608 | 12/1995 | WIPO . |

OTHER PUBLICATIONS

Derwent abstract, Accession No. 96–049646 (& WO–A–95 34608).
PAJ–abstract of JP–A–7 331 180 (corresponding document of WO–A–95 03608).
Derwent Abstracts, AN 91–214016, SU 1 604 769, Nov. 7, 1990.
Patent Abstracts of Japan, vol. 15, No. 461 (C–0887), Nov. 22, 1991, JP 03 197335, Aug. 28, 1991.
Bunseki, 1994, 8, pp. 653–657.

*Primary Examiner*—Benjamin L. Utech
*Assistant Examiner*—Duy-Vu Deo
*Attorney, Agent, or Firm*—Oblon, Spivak, McClelland, Maier & Neustadt, P.C.

[57] ABSTRACT

A method for removing a thin film, which comprises applying a powder or solution of a salt to a thin film formed on a substrate, followed by heating to remove the thin film at the applied portion, wherein as the salt, a salt having some or all of hydrogen ions of an acid substituted by ammonium ions or alkali metal ions, is used.

5 Claims, No Drawings

METHOD FOR REMOVING A THIN FILM FOR A WINDOW GLASS

The present invention relates to a method for removing a thin film formed on a substrate such as a window glass for an automobile.

As a method for removing a part of a thin film formed on a substrate, a method is practically used wherein, prior to forming a thin film, a masking material is coated at a position from which the thin film is expected to be removed, then a thin film is formed over the entire substrate, and finally the masking material is removed so that the thin film is simultaneously removed. However, by this method, it is necessary to carry out the masking operation, and the method for forming a thin film is rather restricted.

There are many thin films of metal oxides which can be dissolved by an acid such as hydrochloric acid. Accordingly, a method may be employed wherein a resist is coated on a substrate having such a thin film already formed thereon, then the thin film at a portion where the resist is not coated, is dissolved by means of hydrochloric acid, and finally the resist is removed. However, this method requires multi steps including printing of the resist, drying it and removal of the resist after dissolving the thin film, and it is difficult to carry out this method at low costs.

Further, it has been reported that a metal oxide powder can be fused by an ammonium salt (Bunseki, 1994, 8, p653–657). However, this report discloses nothing about its application to removal of a thin film formed on a substrate.

It is an object of the present invention to provide a method whereby a part or whole of a thin film formed on a substrate can be removed easily at a low cost without requiring a masking operation or coating of a resist.

The present invention provides a method for removing a thin film, which comprises applying a powder or solution of a salt to a thin film formed on a substrate, followed by heating to remove the thin film at the applied portion, wherein as the salt, a salt having some or all of hydrogen ions of an acid substituted by ammonium ions or alkali metal ions, is used.

Now, the present invention will be described in detail with reference to the preferred embodiments.

The material of the substrate to be used in the present invention is not particularly limited, and any substrate may be employed so long as it is resistant against the particular salt and undergoes no quality change by heating. For example, glass, ceramics and plastics may be mentioned. A silicate glass may be mentioned as one of preferred materials for the substrate. The present invention is applicable also to a crystal such as quartz.

The shape of the substrate may be in the form of a plate or bulk. Further, the substrate may be flat or curved.

The present invention is useful for a window glass, particularly for a window glass of an automobile. More specifically, it is suitable for removing a heat ray reflecting film formed over the entire rear window glass of an automobile, at the high mount stop lump portion.

The thin film suitable for the present invention may, for example, be a metal oxide film, a metal nitride film or a metal film. As the metal oxide film, preferred is a metal oxide film comprising an oxide of at least one metal selected from the group consisting of cobalt, titanium, copper, iron, zinc, tin, aluminum, zirconium, manganese, nickel and niobium. The metal oxide film comprising an oxide of at least one metal, may, for example, be a film comprising a certain metal oxide as the main component, or a film of a composite oxide of two or more metals.

As the metal nitride film, a metal nitride film comprising titanium nitride is preferred. As the metal film, a metal film comprising silver or stainless steel (SUS) is preferred. Especially as a heat ray reflecting film for an automobile, the above metal oxide film is preferred.

The present invention is particularly suitable for removing a part of a metal oxide film comprising cobalt oxide, formed on a substrate. The metal oxide film comprising cobalt oxide, may, for example, be a film comprising cobalt oxide as the main component, or a film of a composite oxide of cobalt and other metals.

The metal oxide film comprising cobalt oxide may, for example, be a metal oxide film comprising cobalt oxide as the main component. More specifically, it may, for example, be a composite oxide film comprising cobalt oxide as the main component and containing iron and/or chromium. Particularly preferred is a composite oxide film having a composition wherein the molar ratio of iron/cobalt is form 0 to 1 (inclusive of a case where no iron is present), and the molar ratio of chromium/cobalt is from 0 to 1 (includes of a case where no chromium is present).

As a method for forming the thin film, a spraying method, a dipping method, a CVD method, a sputtering method or a flexographic printing method may, for example, be mentioned. The present invention is suitable particularly for a thin film formed by a spraying method where the substrate temperature during formation of the thin film, is so high that it is difficult to employ a resist.

The thickness (geometrical film thickness) of the above thin film is preferably from 5 to 1000 nm, particularly preferably from 10 to 400 nm, whereby the thin film can exhibit its function (such as a heat ray reflecting function), and good results can be obtained in removal of the thin film.

The salt to be used in the present invention, may, for example, be at least one salt selected from the group consisting of a hydrohalogenate, a sulfate, a disulfate, an amidosulfate, a sulfite, a thiosulfate, a phosphate, a formate and an oxalate.

Specifically, it may, for example, be an ammonium salt, an alkali metal hydrogensulfate, an alkali metal disulfate, an alkali metal amidosulfate, an alkali metal thiosulfate, or an alkali metal dihydrogenphosphate. The alkali metal for the alkali salt is preferably sodium or potassium.

More specifically, ammonium chloride, ammonium bromide, ammonium iodide, ammonium sulfate, ammonium hydrogensulfate, ammonium disulfate, ammonium amidosulfate, ammonium sulfite, ammonium hydrogensulfate, ammonium thiosulfate, triammonium phosphate, ammonium dihydrogenphosphate, diammonium hydrogenphosphate, ammonium formate, ammonium oxalate, sodium hydrogensulfate, potassium hydrogensulfate, sodium disulfate, potassium disulfate, sodium amidosulfate, potassium amidosulfate, sodium thiosulfate, potassium thiosulfate, sodium dihydrogenphosphate, or potassium dihydrogenphosphate, may be mentioned.

Application of a powder or solution of the above salt may, for example, be coating of a powder of the above salt, coating of a liquid containing a powder of the above salt or coating of a solution of the above salt. It is particularly convenient to apply the salt in the form of a liquid containing the powder (having the powder dispersed in a dispersing liquid) or a solution (having the powder dissolved in a solvent).

The above dispersing liquid or solvent may, for example, be water or an organic solvent of an alcohol, ester or ether type. Specifically, it may, for example, be water, α-terpineol, ethyl cellosolve or butyl carbitol acetate.

The amount of the powder in the dispersing liquid (or the solvent) is preferably such that the weight ratio of the dispersing liquid (or the solvent) to the powder is from 1:0.5 to 1:10, particularly preferably from 1:1 to 1:8. Further, the powder may not necessarily be completely dissolved in the solvent, i.e. a part thereof may remain undissolved.

When the salt is applied in the form of a liquid or solution containing the powder, an agent which(a thickener) brings about a viscosity-increasing effect to a liquid, may be added. Especially in the application by a printing method which will be described hereinafter, it is preferred to use a liquid having a thickener added thereto. As a thickener, ethyl cellulose, methyl cellulose, an acrylic resin, a styrene resin, a phenol resin or sodium alginate may, for example, be mentioned. In such a case, the viscosity of the liquid is preferably from 5,000 to 200,000 cp, particularly preferably, from 10,000 to 100,000 cp, after the addition of the thickener.

The above powder preferably has an average particle size of from 0.1 to 150 $\mu$m, particularly preferably from 1 to 60 $\mu$m.

As the application method, a printing method such as screen printing or flexographic printing, a spraying method or a dipping method may, for example, be employed. Further, it is possible to coat a resist, or to paste a film, on a portion of the thin film where it is not desired to decompose the thin film, so that such a portion is protected.

The heating in the present invention may be carry out by an electric furnace capable of heating the entire substrate.

The heating temperature may be at a level where the thin film will react with the above salt. Under the heating, the above salt fuses or decomposes to form a reactive acid, which, in turn, decomposes the thin film. The heating temperature is preferably at least the decomposition temperature of the salt in the case of the salt decomposable by heating, or at least the melting point of the salt in the case of the salt which fuses by heating.

With respect to the upper limit, the temperature may be up to a level where the substrate undergoes no fusion, decomposition or substantial deformation. Accordingly, in a case where the substrate is glass, the temperature may be raised to a level close to the softening point of glass. Especially in the case of a soda lime silicate glass to be used for a window glass of an automobile, the temperature may be raised to a vicinity of 740° C.

In a case where ammonium hydrogensulfate is used as the above salt, the temperature is preferably at least 147° C. where ammonium hydrogensulfate fuses.

In a case where a disulfate and/or phosphate is used as the above salt and a soda lime silicate glass is used as the substrate, the temperature is suitably at most 350° C., since if the temperature is too high, a reaction is likely to occur between the salt and the substrate.

After the heating, washing with water is carried out, as the case requires. Any unreacted excess salt can be removed by washing with water.

Now, the present invention will be described in further detail with reference to Examples. However, it should be understood that the present invention is by no means restricted to such specific Examples.

EXAMPLE 1

A 50 wt % solution of ammonium hydrogensulfate was manually coated on a part of a thin film of a composite oxide of cobalt, iron and chromium (molar ratio of iron/cobalt:0.25, molar ratio of chromium/cobalt:0.14, geometrical film thickness: about 50 nm, hereinafter referred to simply as the thin film) formed by a spraying method on a soda lime silicate glass and heated to 170° C., whereby the thin film at the portion where the above solution was coated, was decomposed in ten minutes. After cooling, the decomposed thin film was removed together with unreacted ammonium hydrogensulfate by washing with water.

EXAMPLE 2

The same operation as in Example 1 was carried out except that instead of the manual coating of a 50 wt % solution of ammonium hydrogensulfate in Example 1, a solution having carboxy methyl cellulose dissolved as a thickener to a 50 wt % solution of ammonium hydrogensulfate, was coated by a screen printing method. The thin film at the portion where the above solution was coated, was decomposed in 20 minutes. After cooling, the decomposed thin film was removed together with unreacted ammonium hydrogensulfate by washing with water.

EXAMPLE 3

A solution prepared by mixing a powder of ammonium sulfate and an α-terpineol solution containing 8 wt % of ethyl cellulose in a weight ratio of 4:1, was coated on a part of the same thin film as in Example 1 by a screen printing method. Then, it was heated to 300° C., whereby the thin film at the portion where the above solution was coated, was decomposed in ten minutes. After cooling, the decomposed thin film was removed together with unreacted ammonium sulfate by washing with water.

EXAMPLE 4

In the same manner as in Example 1, a thin film (molar ratio of iron/cobalt:0.25, molar ratio of chromium/cobalt:0.14, geometrical film thickness: about 50 nm) was formed on soda lime silicate glass. Then, the glass was cut into a shape of a rear window glass for an automobile.

On the other hand, a solution (viscosity: about 30,000 cp) was prepared by mixing an α-terpineol solution containing 9 wt % of ethyl cellulose and a powder of ammonium dihydrogenphosphate (average particle size: about 30 $\mu$m) in a weight ratio of 3:7.

Then, the above solution was coated by a screen printing method on a part of the thin film corresponding to a position where a high mount stop lump is expected to be provided on the rear window glass for an automobile having the above thin film formed. Then, the rear window glass for an automobile was heated in an electric furnace to 200° C., whereby the thin film at the portion coated with the solution, was decomposed in ten minutes. After cooling, the decomposed thin film was removed together with unreacted ammonium dihydrogenphosphate by washing with water.

Then, a usual colored ceramic print was applied to the rear window glass for an automobile, followed by heating and air cooling reinforcement by a reinforcement step, to obtain a desired rear window glass for an automobile, provided with a thin film.

EXAMPLE 5

The same operation as in Example 4 was carried out except that the heating temperature was changed to 260° C., whereby the thin film at the portion coated with the solution was decomposed in 5 minutes, and the same rear window glass for an automobile, provided with a thin film, as in Example 4, was obtained.

EXAMPLE 6

The same operations as in Examples 1 to 5 were carried out except that the thin films in Examples 1 to 5 were changed to a SUS film (film thickness is about 15 nm), the heating temperature was changed to 260° C. whereby the thin film at the portion coated with the solution was decomposed in 20 minutes, the same good results were obtained.

Further, the same operations as in Examples 1 to 5 were carried out except that the thin films in Examples 1 to 5 were changed to a titanium oxide film (film thickness is about 50 nm), the heating temperature was changed to 260° C. whereby the thin film at the portion coated with the solution was decomposed in 20 minutes, the same good results were obtained.

According to the present invention, thin films formed by various methods can be removed in a short period of time and partial decomposition of the thin films, which used to be difficult, can be made possible.

The method of the present invention can be used particularly preferably as a method for partially removing a metal oxide thin film comprising cobalt oxide formed as a heat ray reflecting film on a rear window glass for an automobile.

Further, the method of the present invention may be applied over the entire thin film formed on a substrate to remove the thin film without impairing the substrate, whereby the substrate can be regenerated.

What is claimed is:

1. A method for removing a part of a thin film having a thickness of 5 to 1000 nm, which comprises applying a solution of a salt by a printing method to said part of a thin film formed on a glass substrate, followed by heating to a temperature of at least the decomposition temperature or melting point of the salt, to remove the part of the thin film at the applied portion, wherein as the salt, a salt having at least one hydrogen ion of an acid substituted by ammonium ions is used and the solution of the salt contains a thickener.

2. The method for removing a thin film according to claim 1, wherein the thin film is a metal oxide film comprising an oxide of at least one metal selected from the group consisting of cobalt, titanium, copper, iron, zinc, tin, aluminum, zirconium, manganese, nickel and niobium.

3. The method for removing a thin film according to claim 1, wherein the thin film is a metal oxide film comprising cobalt oxide.

4. The method for removing a thin film according to claim 1, wherein as the salt, at least one salt selected from the group consisting of a hydrohalogenate, a sulfate, a disulfate, an amidosulfate, a sulfite, a thiosulfate, a phosphate, a formate or an oxalate, is used.

5. The method for removing a thin film according to claim 1, wherein the substrate is a window glass for an automobile.

* * * * *